(12) United States Patent
Rosseel et al.

(10) Patent No.: US 11,564,354 B2
(45) Date of Patent: Jan. 31, 2023

(54) ROTOR ASSEMBLY FOR AN AGRICULTURAL BALER

(71) Applicant: CNH Industrial America LLC, New Holland, PA (US)

(72) Inventors: Bram Rosseel, Snellegem (BE); Jonas Vaneygen, Ledeberg (BE); Dries Liefooghe, Alveringem (BE); Eddy Roland Lammerant, Koksijde (BE); Dieter Kindt, Vladslo (BE); Jeroen Devroe, Izegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/822,835

(22) Filed: Mar. 18, 2020

(65) Prior Publication Data

US 2020/0296897 A1 Sep. 24, 2020

(30) Foreign Application Priority Data

Mar. 18, 2019 (EP) .................................... 19163384

(51) Int. Cl.
*A01F 15/10* (2006.01)

(52) U.S. Cl.
CPC .................... *A01F 15/10* (2013.01)

(58) Field of Classification Search
CPC .... A01F 15/10; A01F 2015/108; A01F 29/04; A01D 90/04; A01D 90/02
See application file for complete search history.

(56) References Cited

U.S. PATENT DOCUMENTS

| | | | | |
|---|---|---|---|---|
| 6,595,123 B2* | 7/2003 | Schrag | ................... | A01F 15/101 100/97 |
| 6,679,041 B2* | 1/2004 | Viaud | ..................... | A01F 15/10 56/16.4 R |
| 6,886,312 B1* | 5/2005 | Inman | ................... | A01F 25/183 100/144 |
| 7,694,504 B1* | 4/2010 | Viaud | ................... | A01D 90/04 56/341 |

(Continued)

FOREIGN PATENT DOCUMENTS

| | | |
|---|---|---|
| DE | 102004061678 A1 | 7/2006 |
| DE | 102016103018 A1 | 8/2017 |

(Continued)

OTHER PUBLICATIONS

Extended European Search Report for EP Application No. 19163384.1 dated Oct. 16, 2019 (four pages).

*Primary Examiner* — Arpad Fabian-Kovacs
(74) *Attorney, Agent, or Firm* — Patrick M. Sheldrake; Peter K. Zacharias

(57) ABSTRACT

A rotor assembly for an agricultural baler. The rotor assembly has a rotor shaft having a central portion and first and second end portions either side of the central portion. The rotor assembly further has a number of tine plates to be arranged axially along the rotor shaft, each of the tine plates having one or more tines. The tine plates are arranged such that there is an angular spacing between the tines of adjacent ones of the tine plates. A magnitude of the angular spacing is greater or smaller at the central portion than at the first and second end portions of the rotor shaft.

20 Claims, 4 Drawing Sheets

(56) References Cited

U.S. PATENT DOCUMENTS

| | | | |
|---|---|---|---|
| 7,867,072 B2* | 1/2011 | Lauwers | A01D 90/04 |
| | | | 460/112 |
| 8,205,424 B1 | 6/2012 | Lang et al. | |
| 9,144,200 B2* | 9/2015 | Chaney | A01F 15/10 |
| 10,039,237 B2* | 8/2018 | Smith | A01F 15/106 |
| 10,398,082 B2* | 9/2019 | Rittershofer | A01D 41/1243 |
| 10,524,424 B2* | 1/2020 | Seo | A01F 15/106 |
| 2008/0264028 A1* | 10/2008 | Woodford | A01D 89/008 |
| | | | 56/16.4 R |
| 2009/0025358 A1* | 1/2009 | Woodford | A01D 89/002 |
| | | | 56/364 |
| 2010/0229520 A1 | 9/2010 | Lauwers et al. | |
| 2011/0023440 A1* | 2/2011 | Matousek | A01F 15/10 |
| | | | 56/341 |
| 2013/0167497 A1* | 7/2013 | Van De Weijer | A01D 90/04 |
| | | | 56/341 |
| 2014/0109542 A1* | 4/2014 | McClure | A01F 15/10 |
| | | | 56/341 |
| 2017/0105355 A1 | 4/2017 | Rosseel et al. | |
| 2018/0070532 A1 | 3/2018 | Rittershofer et al. | |
| 2020/0170191 A1* | 6/2020 | Devroe | A01F 15/042 |

FOREIGN PATENT DOCUMENTS

| | | |
|---|---|---|
| EP | 0655189 A1 | 5/1995 |
| EP | 2387872 A1 | 11/2011 |
| EP | 2721919 A1 | 4/2014 |
| EP | 2893798 A1 | 7/2015 |
| EP | 2941947 A1 | 11/2015 |
| IE | 20150124 A1 | 2/2016 |
| WO | 2017140797 A1 | 8/2017 |

\* cited by examiner

ROTOR ASSEMBLY FOR AN AGRICULTURAL BALER

TECHNICAL FIELD

The present invention relates to a rotor assembly for an agricultural baler and in particular, but not limited to, a rotor assembly for moving crop material collected by the agricultural baler. Aspects of the invention relate to a rotor assembly and to an agricultural baler.

BACKGROUND OF THE INVENTION

Agricultural balers are used to consolidate and package crop material so as to facilitate the storage and handling of the crop material for later use. For example, when the crop is hay a mower-conditioner is typically used to cut and condition the crop material for windrow drying in the sun. As another example, when the crop is straw an agricultural combine discharges non-grain crop material from the rear of the combine defining the straw which is to be picked up by the baler. The cut crop material is usually dried, and a baler, such as a large square baler or round baler, straddles the windrows and travels along the windrows to pick up the crop material and form it into bales.

On a large square baler, pickup apparatus at the front of the baler gathers the cut and windrowed crop material from the ground. The pickup apparatus includes a pickup roll, and optionally may include other components such as side shields, stub augers, a wind guard, etc. A rotor cutter apparatus is then used to move the crop material from the pickup apparatus to a pre-compression chamber or duct. The rotor cutter apparatus forms a so-called 'wad' of crop within the pre-compression chamber which is then transferred to a main bale chamber.

Stuffer apparatus transfers the wad of crop material in charges from the pre-compression chamber to the main bale chamber. Typically, the stuffer apparatus includes stuffer forks which are used to move the wad of crop material from the pre-compression chamber to the main bale chamber, in sequence with the reciprocating action of a plunger within the main bale chamber.

In the main bale chamber, after the wad is injected into the bale chamber, the plunger compresses the wad of crop material into a so-called 'flake' against previously formed flakes to form a bale and, at the same time, gradually advances the bale towards the outlet of the bale chamber. Pressure exerted by the walls of the bale chamber dictates the frictional force needed to overcome friction and shift the flakes in the chamber. An increased force to shift the flakes causes the plunger to compact the flakes tighter, and thereby produce a higher-density bale.

The bale chamber typically has three moving walls (a top wall and two side walls), which may be positioned by two hydraulically controlled actuators connected to a cam mechanism. When enough flakes have been added and the bale reaches a full (or other predetermined) size, a number of knotters are actuated which wrap and tie twine, cord, or the like around the bale while it is still in the main chamber. The twine is cut and the formed bale is ejected out the back of the baler as a new bale is formed.

Returning to the rotor cutter apparatus, typically this includes a rotor assembly having a rotor shaft and a number of tine plates arranged axially along the rotor shaft and which rotate with the rotor shaft. Each of the tine plates has one or more tines which, as the rotor shaft rotates, engage with the crop to move the crop material from the pickup unit towards a knife rack. The knife rack typically has knives for cutting the crop into smaller pieces before it reaches the pre-compression chamber.

As well as simply moving the crop towards the pre-compression chamber, it is desirable for the rotor assembly to arrange the collected crop so that the crop is equally distributed as it is loaded into the pre-compression chamber. This ensures that the entire pre-compression chamber is filled, which assists in allowing a desired bale rate of the baler to be reached. In order to distribute the crop, typically the tine plates are arranged on the rotor shaft such that the tines form a particular pattern or shape. For example, it is known to arrange the tine plates so that the tines form or define a 'V'-shape or profile with a corner at a central or middle portion of the rotor shaft and two straight lines extending out towards end or side portions of the rotor shaft. However, such a rotor shape may not provide equal distribution of the crop in certain cases. For instance, for relatively wide-windrow crop collection the amount of crop filling at the sides of the pre-compression chamber can be too high to provide an optimal or desired bale shape. Also, for relatively narrow-windrow crop collection the V-rotor transports the crop to the pre-compression chamber with little or no spreading, which leads to unequal crop distribution in the pre-compression chamber.

It is an aim of the present invention to address one or more disadvantages associated with the prior art.

SUMMARY OF THE INVENTION

According to an aspect of the present invention there is provided a rotor assembly for an agricultural baler. The rotor assembly comprises a rotor shaft having a central portion and first and second end portions either side of the central portion. The rotor assembly comprises a plurality of tine plates to be arranged axially along the rotor shaft. Each of the tine plates comprises a tine. The tine plates may be arranged such that there is an angular spacing between the tines of adjacent ones of the tine plates. A magnitude of the angular spacing may be greater at the central portion than at the first and second end portions. Alternatively, the magnitude of the angular spacing may be greater at the central portion than at the first and second end portions. The central portion may be regarded as the central point or simply the vicinity of a central portion of the rotor assembly or shaft. Likewise, the first and second end portions may be regarded as being in the vicinity of the first and second end portions. The section of the rotor shaft between the central portion and the first end portion may be referred to as a first shaft section, and the section of the rotor shaft between the central portion and the second end portion may be referred to as a second shaft section. The tine plate may be generally circular shaped. A tine may also be referred to as a prong, sharp peak, protrusion, point or other suitable term. The angular spacing between tines may be regarded as an angle between the tines relative to the rotor shaft or a point of the rotor shaft, for example the axis of rotation of the rotor shaft. In particular, the angular spacing between tines may be the angular spacing between respective tips of the tines.

By having an angular spacing between tines that is greater at the centre of the rotor shaft compared with the ends or sides means that tine spacing may be regarded as being more aggressive at the centre and less aggressive at the ends or sides. By having more aggressive tine spacing at the centre, crop is distributed or spread by the rotor assembly from the centre out towards the side portions of the rotor shaft. This is particularly useful when collecting crop in relatively narrow windrows, e.g. windrows having a width less than that of the rotor shaft. Also, by having less aggressive angular spacing of the tines at the end portions ensures that sufficient crop remains towards or at the side portions of the rotor shaft, and therefore the sides of the pre-compression chamber are filled with a sufficient amount of the collected crop. This may be particularly useful when collecting crop in relatively wide windrows. In both cases this helps to ensure that the crop is more evenly distributed when it is moved into a pre-compression chamber of the baler, in particular that the crop that fills the sides of the pre-compression chamber is optimal. By having the crop more evenly distributed in the pre-compression chamber means that a desired bale shape and bale rate may be more readily achieved. Alternatively, by having an angular spacing between tines that is smaller at the centre of the rotor shaft compared with the ends or sides means that tine spacing may be regarded as being less aggressive at the centre and more aggressive at the ends or sides. By having less aggressive tine spacing at the centre, crop may be moved by the rotor assembly towards the centre from one or more of the side portions of the rotor shaft. This may be particularly useful, for example, if the baler is not correctly lined up with the windrow of crop it is collecting.

When the magnitude of the angular spacing is greater at the central portion than at the first and second end portions, the magnitude of the angular spacing may decrease from the central portion to each of the first and second end portions.

When the magnitude of the angular spacing is smaller at the central portion than at the first and second end portions, the magnitude of the angular spacing may increase from the central portion to each of the first and second end portions.

The decrease or increase in the angular spacing may be monotonic. Advantageously, this ensures a consistent direction of spreading of the collected crop to ensure even distribution in the pre-compression chamber.

The tines may define a first curve between the central portion and the first end portion. That is, the tines may define the first curve in the first shaft section, with the first curve spanning some or all of the first shaft section. The tines may define a second curve between the central portion and the second end portion. That is, the tines may define the second curve in the second shaft section, with the second curve spanning some or all of the second shaft section. Each of the tines of the respective first and seconds tines may therefore be regarded as being 'in-phase' with one another. Arrangement of the tines to define such a curve or smooth shape/pattern helps to ensure more predictable and even spreading or swathing of the collected crop. The tines have tips or pointed ends and, in particular, it may be the tips or tops of the tines that define the first and second curves.

The first and/or second curves may be quadratic curves. This is a particularly advantageous smooth shape to provide an even distribution of crop.

The first curve may have no extrema between the central portion and the first end. The second curve may have no extrema between the central portion and the second end. That is, there is no change in the direction of the angular spacing in the first shaft section or in the second shaft section.

The first and/or second curves may form a corner at the central portion. Alternatively, a smooth meeting point may be defined by the tines in the vicinity of the central portion.

There may be a phase difference between the first and second curves at the central portion. The phase difference is an angular spacing between the respective tines of the first and second curves at the central portion, i.e. the first and second curves do not meet at the central portion, either in a smooth manner or otherwise. That is, there is a discontinuity between the first and second curves at the central portion. A phase difference between the first and second curves may be referred to as the first and second curves being 'out of phase' with each other. This helps to ensure that no crop blockage develops in the vicinity of the central portion of the shaft. In addition, such a phase difference may help to ensure that the rotor assembly distributes or spreads crop evenly towards both sides of the rotor shaft and does not favour distribution to just one of the sides.

The tines may define a plurality of first curves between the central portion and the first end portion in a circumferential segment of the rotor shaft. The tines may define a plurality of second curves between the central portion and the second end portion in the circumferential segment of the rotor shaft.

Each of the tine plates may comprise a plurality of tines spaced angularly apart. The tine plates may be arranged such that the tines define a plurality of first curves and/or a plurality of second curves in an axial segment of the rotor shaft. This may increase the efficiency of the tine plate as the cleaning frequency and the amount of crop that may be moved towards a pre-compression chamber by the tines increasing over a single rotation of the rotor shaft.

The rotor assembly may comprise first and/or second end plates at the first and/or second ends, respectively, of the rotor shaft. The first and/or second end plates may each comprise a tine. The first and/or second end plates may be arranged such that their respective tine is adjacent to the tines of the adjacent tine plates.

The tine plates may be spaced equidistantly along the rotor shaft.

The tines of adjacent ones of the tine plates may be of different length. This helps to ensure a balance between the amount of crop being collected and moved by the rotor assembly, and cleaning of the tines by scraper apparatus adjacent to the rotor assembly. Longer tines may be regarded as providing a greater cleaning effect when used in conjunction with a scraper. In addition, the provision of short tines next to longer tines may be considered to provide a higher intake of crop material to a pre-compression chamber. The length of one of the tines may be regarded as the distance from a tip or point of the tine to a body of the tine plate, for example to an inner edge of the tine plate. In such a case, the length of the tines is equal to their thickness in a radial direction. Alternatively, the length of one of the tines may be regarded as the length of one of the sides or edges of the tines.

An angular orientation of the tine plates may be adjustable to adjust the angular spacing between the tines of adjacent ones of the tine plates. Advantageously, this allows for the aggressiveness of the tine spacing to be changed or altered at one or more points along the width of the rotor shaft. This means that the tine spacing may be optimised to convey and spread crop depending on the type of crop and width of the windrows.

According to another aspect of the present invention there is provided an agricultural baler comprising a rotor assembly as described above.

BRIEF DESCRIPTION OF THE DRAWINGS

One or more embodiments of the invention will now be described, by way of example only, with reference to the accompanying drawings, in which.

DETAILED DESCRIPTION OF THE DRAWINGS

Figure 1:
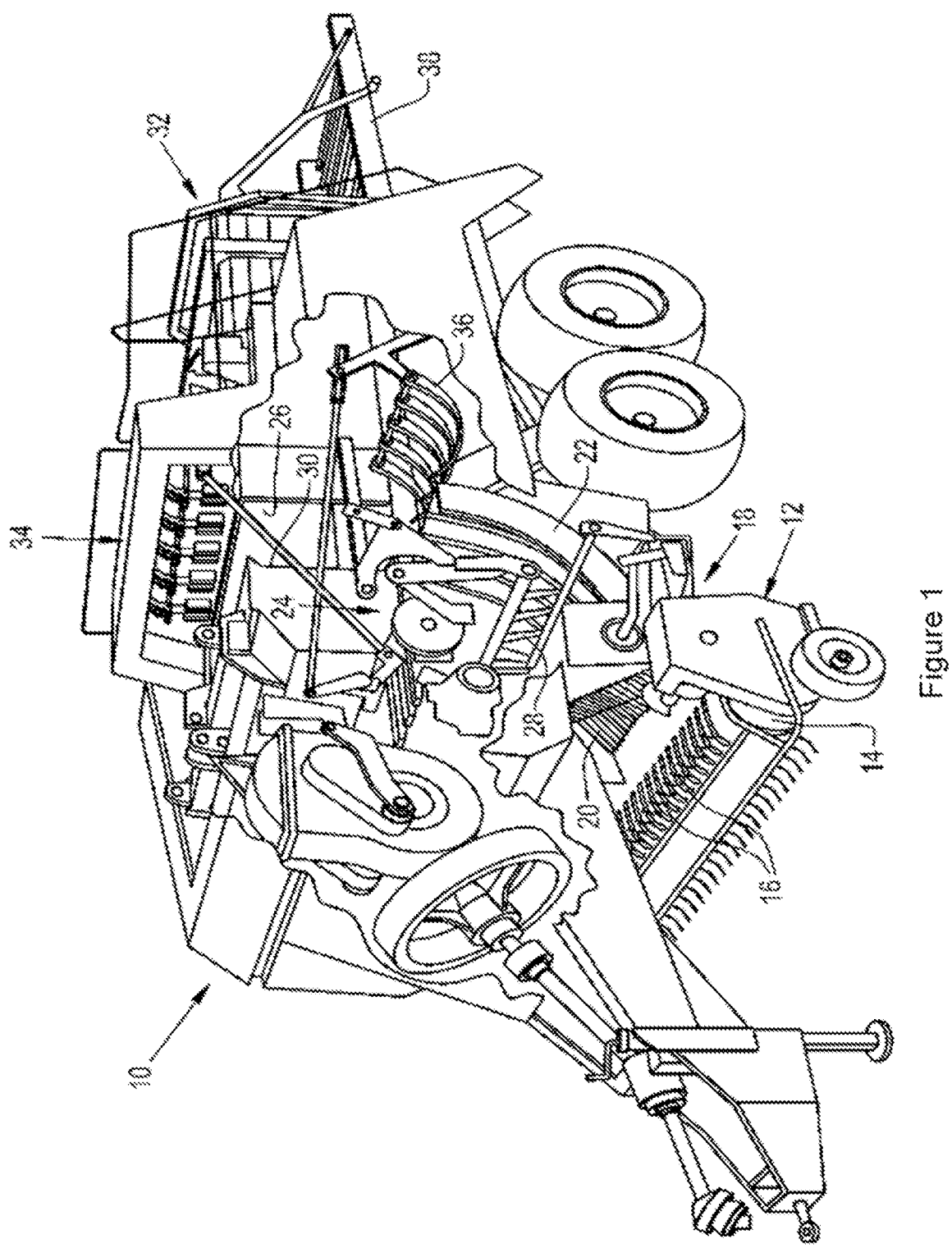
FIG. 1 is a perspective cutaway view of an agricultural baler including a crop pickup apparatus and a rotor cutter apparatus having a rotor assembly according to an embodiment of an aspect of the invention.

FIG. 1 shows an agricultural baler 10 in the form of a large square baler. In particular, FIG. 1 is a perspective cutaway view illustrating the inner workings of the large square baler 10. The baler 10 has a pickup unit or apparatus 12 for lifting crop material from windrows. The pickup apparatus 12 has a rotatable pickup roll (or rotor or cylinder) 14 with a number of pickup tines 16 to move the collected crop rearward towards a rotor cutter apparatus 18. Optionally, a pair of stub augers (one of which is shown, but not numbered) is positioned above the pickup roll 14 to move the crop material laterally inward.

The rotor cutter apparatus 18 has a rotor assembly with rotor tines 20 that push the crop towards a knife rack with knives for cutting the crop and into a pre-compression chamber 22 to form a wad of crop material. The tines 20 intertwine the crop together and pack the crop within the pre-compression chamber 22. The pre-compression chamber 22 and the rotor assembly with the tines 20 function as a first stage for crop compression. The rotor assembly and the tines 20 will be discussed in greater detail below.

Once the pressure in the pre-compression chamber 22 reaches a predetermined sensed value, a stuffer unit or apparatus 24 moves the wad of crop from the pre-compression chamber 22 to a bale chamber 26. The stuffer apparatus 24 includes stuffer forks 28 which thrust the wad of crop directly in front of a plunger 30, which reciprocates within the bale chamber 26 and compresses the wad of crop into a flake. The stuffer forks 28 return to their original state after the wad of material has been moved into the bale chamber 26. The plunger 30 compresses the wads of crop into flakes to form a bale and, at the same time, gradually advances the bale toward an outlet 32 of the bale chamber 26. The bale chamber 26 and plunger 30 function as a second stage for crop compression.

When enough flakes have been added and the bale reaches a full (or other predetermined) size, the knotters 34 are actuated which wrap and tie twine around the bale while it is still in the bale chamber. Needles 36 bring the lower twine up to the knotters 34 and the tying process then takes place. The twine is cut and the formed bale is ejected from a discharge chute 38 as a new bale is formed.

Figure 2:
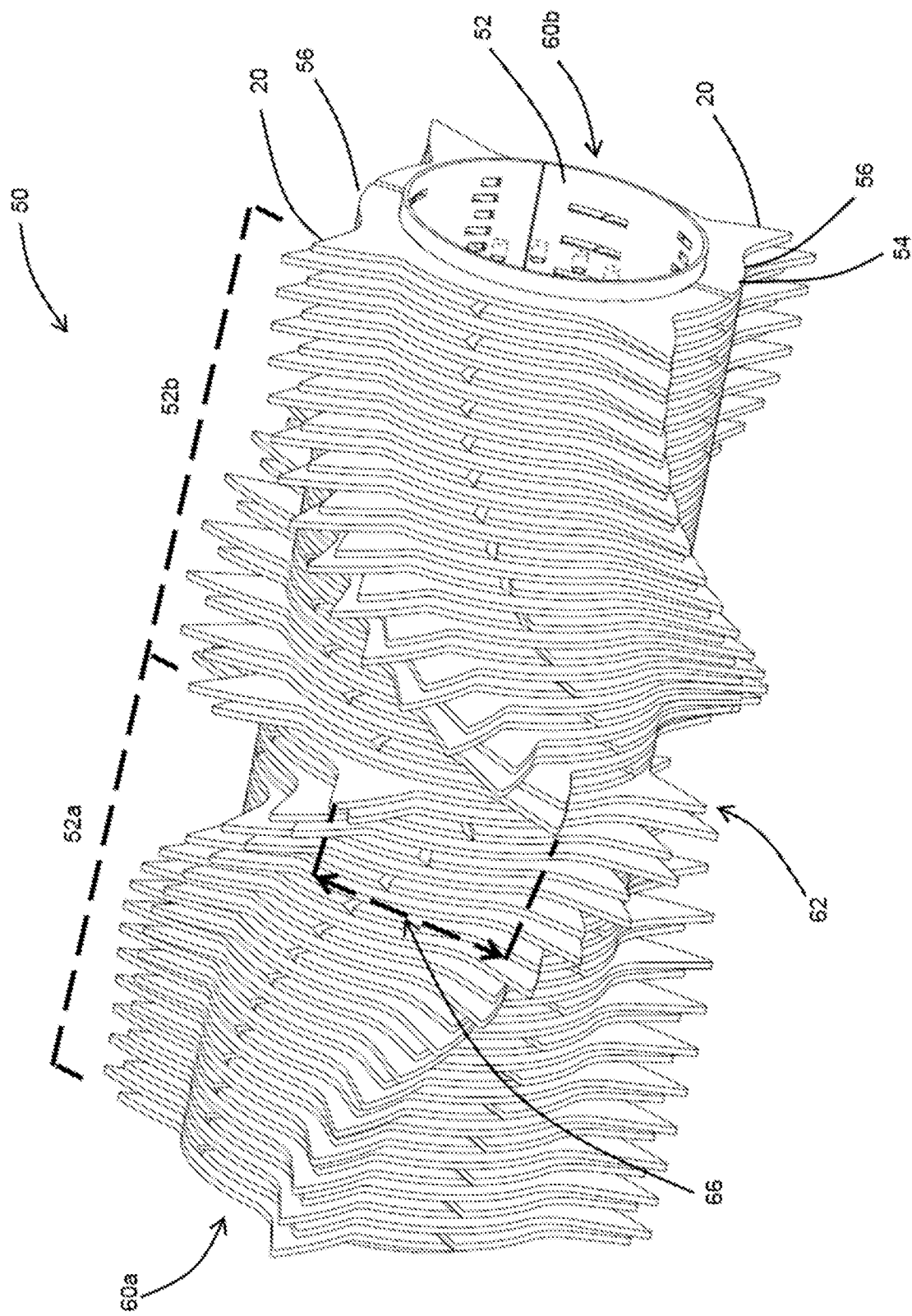
FIG. 2 is a perspective view of the rotor assembly of FIG. 1.
Figure 3:
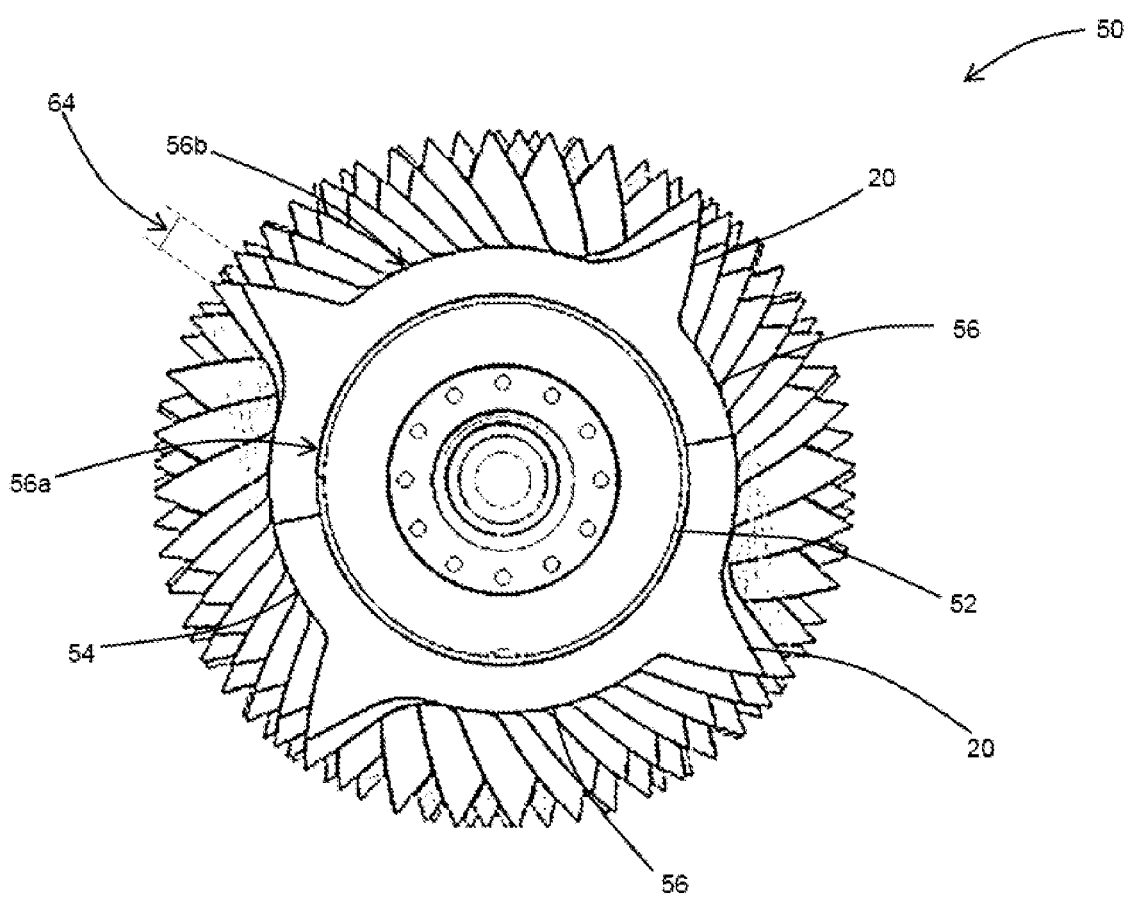
FIG. 3 is a side view of the rotor assembly of FIG. 1.

FIGS. 2 and 3 show perspective and side views of the rotor assembly 50 of the rotor cutter apparatus 18 in FIG. 1. The rotor assembly 50 has a cylindrical rotor shaft 52 rotatable about its axis. The rotor assembly 50 also includes a number of tine plates 54 on the rotor shaft 52, where the tine plates 54 include the rotor tines 20. The tine plates 54 are arranged and spaced axially along the length of the rotor shaft 52. In the described embodiment, the tine plates 54 are spaced equally apart and are parallel relative to each other. The tine plates 54 extend circumferentially all the way around the rotor shaft 52 and have a central circular mounting opening in which the rotor shaft 52 is located. In the described embodiment, the tine plates 54 are formed from metal and are planar. There may be any suitable number of tine plates 54 on the rotor shaft, for example approximately fifty six tine plates 54.

In the described embodiment each tine plate 54 is formed from two tine plate segments 56 that are semi-circular in shape, with an inner edge 56a matching an outer surface of the rotor shaft 52 to which it is to be attached. The tines 20 are located at an outer edge 56b of the tine plate 54. When the two tine plate segments 56 are brought together around the rotor shaft 52 they form the central circular mounting opening in which the rotor shaft 52 is located. The rotor tines 20 are spaced apart angularly by approximately 90 degrees; however, any suitable angular spacing may be chosen. The rotor tines 20 on a particular segment 56 are of equal length in a radial direction in the described embodiment; however, this need not be the case. The two segments 56 forming the tine plate 54 are of similar configuration. That is, each tine plate 54 includes four tines 20 each spaced apart by approximately 90 degrees in the described embodiment.

The radial length of the tines 20 is not equal on each of the tine plates 54 along the length of the rotor shaft 52. In particular, the tine plates 54 have tines 20 of either a first radial length or a second, shorter, radial length. The tine plates 54 are arranged along the rotor shaft 52 such that alternate tine plates 54 have tines 20 of the first length and alternate tine plates 54 have tines 20 of the second length. That is, on either side of a tine plate 54 that has tines 20 of the first length is a tine plate 54 that has tines 20 of the second length, i.e. adjacent tine plates 54 have tines 20 of different length.

As illustrated in FIGS. 2 and 3, when the tine plates 54 are arranged in parallel along the rotor shaft 52, the tines 20 of adjacent tine plates 54 are positioned substantially adjacent to one other. As such, rows or lines of tines 20 are formed along the rotor assembly 50. Note that each row of tines 20 is not a straight line, but instead forms a pattern or shape. Specifically, the shape of each row is defined by the tips or points of each of the tines 20. As the rows formed by the tines 20 along the rotor shaft 52 are not in the form of straight lines then either the tine plates 54 are formed with the tines 20 at slightly different positions in a circumferential or angular direction, and/or the tine plate segments 56 are positioned on the rotor shaft 52 at different angular positions. In the described embodiment, the latter is the case. Irrespective of this, the difference in angular position between adjacent tines 20 on adjacent tine plates 54 is relatively small such that the tines 20 may indeed still be referred to as being adjacent to each other.

The pattern or shape formed by the tines 20 along the rotor shaft 52 is now described in greater detail. The rotor shaft 52 may be split into two axial segments or sections: a first shaft section 52a between a first end 60a and a central portion 62 of the rotor shaft 52; and, a second shaft section 54b between the central portion 62 and a second end 60b of the rotor shaft 52. The first and second ends 60a, 60b are opposite ends of the rotor shaft 52, with the central portion 62 being located therebetween.

Focussing firstly on the first shaft section 52a, the tines 20 form four shaped rows between the first end 60a and the central portion 62 of the rotor shaft 52. There are four rows around the circumference of the rotor shaft 52 as each tine plate 54 has four tines 20. The rows of tines 20 in the first shaft section 52a form a curved shape. This is achieved by arranging the tine plates 54 such that there is an angular spacing 64 between the tines 20 of adjacent ones of the tine plates 54 in the first shaft section 52a. In particular, in order to achieve the curved pattern, a magnitude of the angular spacing 64 between the tines 20 of adjacent ones of the tine plates 54 varies from the central portion 62 to the first end 60a of the rotor shaft 52, i.e. across the length of the first shaft section 52a. More specifically, the magnitude of the angular spacing 64 between adjacent tines 20 in the first shaft section 52a decreases from the central portion 62 to the first end 60a of the rotor shaft 52.

In the described embodiment, the magnitude of the angular spacing 64 varies such that the resulting curve formed by the row of tines 20 is a quadratic curve. The magnitude of the gradient of the quadratic curve is greatest at the central portion 62 and smallest at the first end portion 60a. In the described embodiment, the angular spacing 64 between the tines 20 at the central portion 62 is 12.5 degrees and the angular spacing 64 between the subsequent pair of tines 20 is 11.5 degrees. The angular spacing 64 reduces by 1 degree for each pair of tines along the row from the central portion 62 to the first end portion 60a until the pair of tines at the first end portion 60a, which has an angular spacing 64 of 0.5 degrees. That is, the angular spacing 64 along the row of tines 20 follows quadratic behaviour proportional to $0.5x^2$. It will be understood that any suitable angular spacing 64 between the tines 20 may be selected. However, it is noted that the magnitude of the angular spacing 64 between adjacent tines 20 decreases from the central portion 62 to the first end 60a and, in particular, this decrease is monotonic.

In the described embodiment, the direction of the angular spacing 64 between tines 20 is the same for each pair of adjacent tines 20 in the first shaft section 52a, i.e. between the central portion 62 and the first end portion 60a. That is, the shape or pattern formed by the tines 20 in the first shaft section 52a is curved but has no extrema, i.e. no maximum or minimum between the central portion 62 and the first end portion 60a. The curve defined by the tines 20 may be considered to have its maximum at the first end 60a and its minimum at the central portion 62. In addition to the curve formed by the tines 20 having no extrema, the decrease in angular spacing 64 from the central portion 62 to the first end 60a is monotonic.

As noted above, in the first shaft section 52a the magnitude of the angular spacing 64 between the tines 20 is greater at the central portion 62 than at the first end 60a. The tine spacing or pattern at the central portion 62 may in this case be referred to as being more aggressive than at the first end 60a. That is, the greater the angular spacing 64, the more aggressive the tine pattern is. Expressed differently, the magnitude of the gradient of the curve defined by the tines 20 is greater at the central portion 62 than at the first end 60a.

The curve formed by the tips of the tines 20 in the first shaft section 52a may be referred to as a first curve. As noted above, each of the tine plates 54 has four tines 20 spaced apart by 90 degrees in the angular direction. As such, the first shaft section 52a has four first curves around the circumference of the shaft 52, spaced apart by 90 degrees in the angular direction.

Referring now to the second shaft section 52b, the tines 20 of the tine plates 54 in the second shaft section 52b form a similar shape or pattern to that in the first shaft section 52a, namely, a quadratic curve. In particular, the magnitude of the angular spacing 64 between adjacent tines 20 in the second shaft section 52b decreases from the central portion 62 to the second end 60b of the rotor shaft 52.

The curve formed by the tips of the tines 20 in the second shaft section 52b may be referred to as a second curve. As noted above, each of the tine plates 54 has four tines 20 spaced apart by 90 degrees in the angular direction. As such, the second shaft section 52b has four second curves around the circumference of the shaft 52, spaced apart by 90 degrees in the angular direction.

FIG. 2 shows that the first curves do not meet the second curves at the central portion 62 of the rotor shaft 52. Instead, there is a phase difference between the tine 20 of the first curve at the central portion 62 and the tine 20 of the second curve at the central portion 62. In the described embodiment, the phase difference or angular spacing between these tines 20 is 45 degrees; however, any suitable phase difference may be used. In the described embodiment in which each tine plate 54 has four tines 20 spaced apart equally in the angular direction, the phase difference of 45 degrees at the central portion 62 may be regarded as the first and second curves being completely out of phase. More generally, for tine plates having k tines spaced apart equally in the angular direction, the first and second curves are completely out of phase if the phase difference therebetween is 180/k degrees. Such a phase difference may be optimal for crop distribution.

When referring to the angular spacing 64 between a pair of tines 20, or adjacent tines 20, this may refer to the angular spacing 64 between tines 20 of directly adjacent tine plates 54 or, alternatively, this may refer to the angular spacing 64 between tines 20 of the same length, i.e. the angular spacing 64 between tines 20 of alternate tine plates 54 in the described embodiment. This second alternative may also be understood as a first pair of adjacent tine plates, one with first tines 20 and one with second tines 20, being spaced angularly from a second pair of adjacent tine plates 54 themselves adjacent to the first pair of tine plates 54, the second pair also having one with first tines 20 and one with second tines 20.

Figure 4:
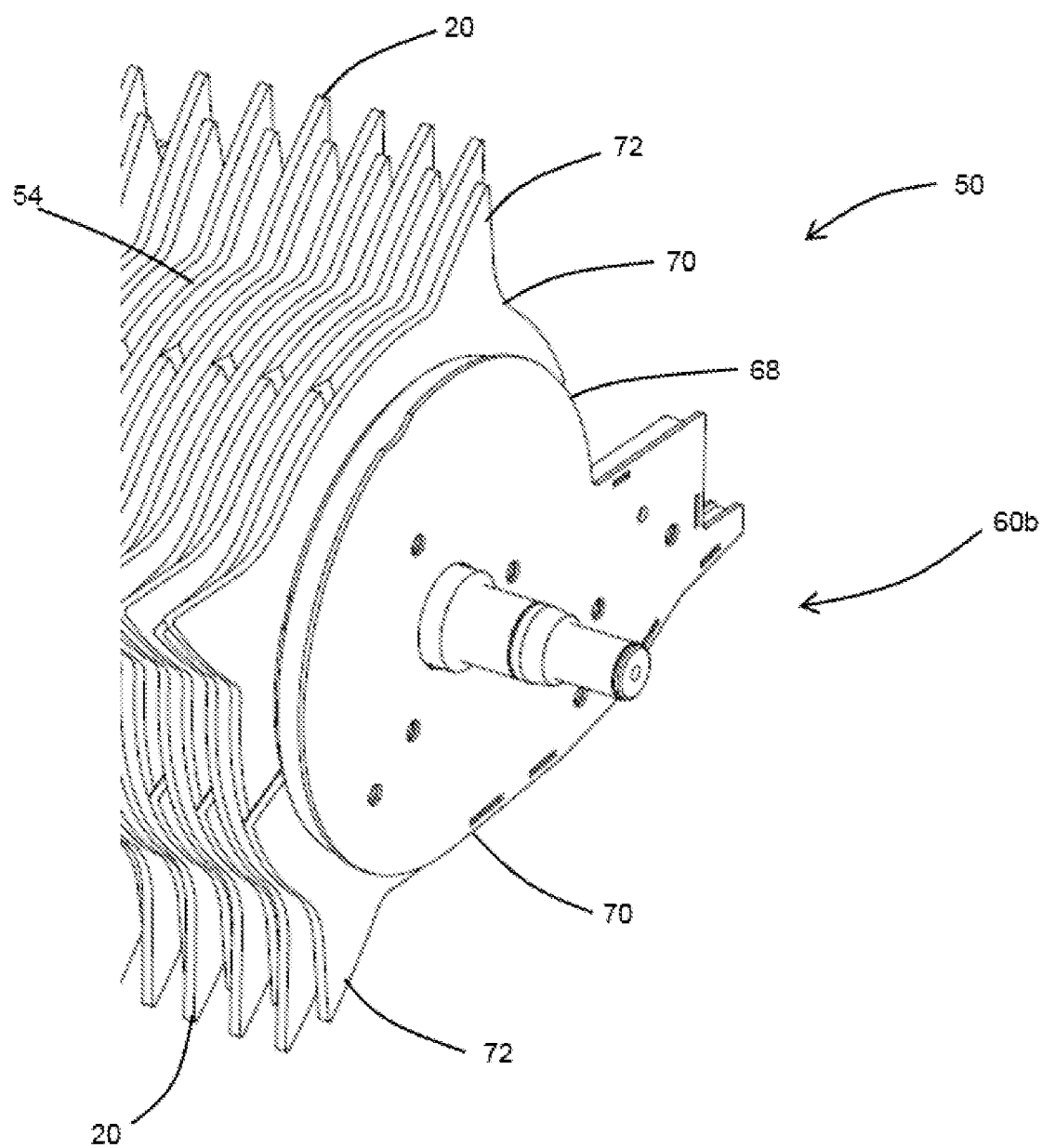
FIG. 4 is a partial perspective view of the rotor assembly of FIG. 1, and shows an end plate of the rotor assembly.

FIG. 4 shows a partial perspective view of the rotor assembly 50, also including an end plate 68 at the second end 60b of the rotor shaft 52. Note the first end 60a also includes an end plate (not shown). The end plates 68 have end plate tine segments 70 with tines 72 similar to the tine plate segments 56 with the tines 20. The end plate tine segments 70 may rotate as the rotor shaft 52 rotates or may remain stationary. In the described embodiment there is a phase difference between the tines 72 of the end plates 68 and the tines 20 of the adjacent tine plates 54. In different embodiments the tines 72 of the end plates 68 may be adjacent to the tines 20 of the adjacent tine plates 54 and, in particular, the tines 72 of the end plates may be a continuation of the first and second curves at the respective first and second ends 60a, 60b.

Many modifications may be made to the above-described embodiments without departing from the scope of the present invention as defined in the accompanying claims.

In the above-described embodiment, each tine plate is formed by two tine plate segments. In different embodiments, each tine plate may be formed from a single piece, or may be formed by more than two plate segments.

In the above-described embodiment, each tine plate has four tines of equal length, with two tines on each of the two plate segments. In different embodiments, each tine plate may have a different number of tines as appropriate, for example two tines, with one tine on each plate segment. Equally, each tine plate may have more than four tines in different embodiments.

In the above-described embodiment, the first curves do not meet the second curves at the central portion 62 of the rotor shaft 52, i.e. there is a phase difference therebetween. In different embodiments, the first curves do meet the second curves at the central portion of the rotor shaft to form a continuous curve defined by the tines all the way along the rotor shaft. The first and second curves may meet in a manner that the resulting curve is smooth at the central portion, or the first and second curves may meet such that there is a corner formed by the tines at the central portion. When the first and second curves meet at the central portion then the tines may be considered to define a single continuous curve or shape along the entire axial length of the rotor shaft 52.

In the above-described embodiment, the rotor shaft 52 is split into two axial shaft segments or sections 52a, 52b, where the tines 20 in the first shaft section 52a define a number of first curves and the tines 20 in the second shaft section 52b define a number of second curves. In particular, in a given circumferential segment of the rotor shaft 52 of the described embodiment, for example approximately equal to or less than 90 degrees, there is a single first curve in the first shaft section 52a and a single second curve in the second shaft section 52b. The resulting pattern may be considered to be a 'quadratic V shape' or 'offset quadratic V shape'. In different embodiments, the given circumferential segment may include more than a single first curve and a single second curve arranged in series along the rotor shaft. In particular, the circumferential segment may include a number of first curves and a number of second curves between the first and second ends of the rotor shaft, for example two first curves and two second curves, alternating between the first and second curves from the first end to the second end. Such a pattern may be considered to be a 'quadratic W pattern or 'offset quadratic W pattern'.

In the above-described embodiment, the tine plates 54 are fixed relative to the rotor shaft 52 and to one another such that the angular spacing 64 between the tines 20 of the tine plates 54 is also fixed. In different embodiments, this need not be the case. In particular, the tine plates 54 may be rotatable around the rotor shaft such that the angular spacing 64 between adjacent tines is adjustable. This would allow the aggressiveness of the tine spacing to be adjusted (and the shape defined by tines to be changed) as needed, for example during use of the agricultural harvester or between uses of the agricultural harvester.

In the above-described embodiment, the magnitude of the angular spacing 64 between adjacent tines 20 in the first shaft section 52a decreases from the central portion 62 to the first end 60a of the rotor shaft 52, and the magnitude of the angular spacing 64 between adjacent tines 20 in the second shaft section 52b decreases from the central portion 62 to the second end 60b of the rotor shaft 52. In different embodiments, the magnitude of the angular spacing between adjacent tines in a first shaft section may instead increase from a central portion to a first end of the rotor shaft. Similarly, in such different embodiments, the magnitude of the angular spacing between adjacent tines in a second shaft section may instead increase from the central portion to a second end of the rotor shaft. As in the described embodiment, in these different embodiments the magnitude of the angular spacing varies such that the resulting curve formed by the row of tines is a quadratic curve. Unlike in the described embodiment, however, in these different embodiments the magnitude of the gradient of the quadratic curve is smallest at the central portion and greatest at the first end portion. In an opposite manner to the described embodiment, in these different embodiments the angular spacing between the tines at the central portion may be 0.5 degrees and the angular spacing between the subsequent pair of tines may be 1.5 degrees. The angular spacing may increase by 1 degree for each pair of tines along the row from the central portion to the first end portion until the pair of tines at the first end portion, which may have an angular spacing of 12.5 degrees. That is, the angular spacing along the row of tines follows quadratic behaviour proportional to $0.5x^2$. It will be understood that any suitable angular spacing between the tines may be selected. However, it is noted that in these different embodiments the magnitude of the angular spacing between adjacent tines increases from the central portion 62 to the first end 60a and, in particular, this increase is monotonic.

The invention claimed is:

1. A rotor assembly for an agricultural baler, the rotor assembly comprising:
   a rotor shaft having a central portion and first and second end portions on either side of the central portion; and
   a plurality of tine plates arranged axially along the rotor shaft, each of the tine plates comprising at least one tine,
   wherein the tine plates are arranged such that there is an angular spacing between the at least one tine of adjacent ones of the tine plates, and
   wherein a magnitude of the angular spacing between the tines of adjacent tine plates varies across a length of a first end portion from the central portion to a first end of the rotor shaft, such that the magnitude of the angular spacing between adjacent tines in the first shaft section increases or decreases along the length of the first end portion from the central portion to the first end of the rotor shaft.

2. The rotor assembly according to claim 1, wherein:
   the magnitude of the angular spacing is greater at the central portion than at the first and second end portions and decreases from the central portion to the first and second end portions, or
   the magnitude of the angular spacing is smaller at the central portion than at the first and second end portions and increases from the central portion to the first and second end portions.

3. The rotor assembly according to claim 2, wherein the decrease or increase in the angular spacing is monotonic.

4. The rotor assembly according to claim 1, wherein each of the tines comprises a tip, and wherein the tips of the tines define a first curve between the central portion and the first end portion and a second curve between the central portion and the second end portion.

5. The rotor assembly according to claim 4, wherein the first and second curves are quadratic curves.

6. The rotor assembly according to claim 4, wherein the first curve has no extrema between the central portion and the first end portion, and wherein the second curve has no extrema between the central portion and the second end portion.

7. The rotor assembly according to claim 4, wherein the first and second curves form a corner at the central portion.

8. The rotor assembly according to claim 4, wherein there is a phase difference between the first and second curves at the central portion.

9. The rotor assembly according to claim 4, wherein the tips of the tines define a plurality of first curves in series between the central portion and the first end portion in a circumferential segment of the rotor shaft, and wherein the tips of the tines define a plurality of second curves in series between the central portion and the second end portion in the circumferential segment of the rotor shaft.

10. The rotor assembly according to claim 4, wherein each of the tine plates comprising a plurality of tines spaced angularly apart, wherein the tine plates are arranged such that the tips of the tines define a plurality of first curves or a plurality of second curves in an axial segment of the rotor shaft.

11. The rotor assembly according to claim 1, further comprising first and second end plates at the first and second end portions, respectively, of the rotor shaft, the first and second end plates each comprising a tine, wherein the first and second end plates are arranged such that their tines are adjacent to the tines of the adjacent tine plates.

12. The rotor assembly according to claim 1, wherein the tine plates are spaced equidistantly along the rotor shaft.

13. The rotor assembly according to claim 1, wherein the tines of adjacent ones of the tine plates are of different length.

14. The rotor assembly according to claim 1, wherein an angular orientation of the tine plates is adjustable to adjust the angular spacing between the tines of adjacent ones of the tine plates.

15. An agricultural baler comprising a rotor assembly comprising:
- a rotor shaft having a central portion and first and second end portions on either side of the central portion; and
- a plurality of tine plates arranged axially along the rotor shaft, each of the tine plates comprising at least one tine,
- wherein the tine plates are arranged such that there is an angular spacing between the at least one tine of adjacent ones of the tine plates, and
- wherein a magnitude of the angular spacing between the tines of adjacent tine plates varies across a length of a first end portion from the central portion to a first end of the rotor shaft, such that the magnitude of the angular spacing between adjacent tines in the first shaft section increases or decreases along the length of the first end portion from the central portion to the first end of the rotor shaft.

16. The agricultural baler according to claim 15, wherein:
- the magnitude of the angular spacing is greater at the central portion than at the first and second end portions and decreases from the central portion to the first and second end portions, or
- the magnitude of the angular spacing is smaller at the central portion than at the first and second end portions and increases from the central portion to the first and second end portions.

17. The agricultural baler according to claim 16, wherein the decrease or increase in the angular spacing is monotonic.

18. The agricultural baler according to claim 15, wherein each of the tines comprises a tip, and wherein the tips of the tines define a first curve between the central portion and the first end portion and a second curve between the central portion and the second end portion.

19. The agricultural baler according to claim 18, wherein the first and second curves are quadratic curves.

20. The agricultural baler according to claim 19, wherein the first curve has no extrema between the central portion and the first end portion, and wherein the second curve has no extrema between the central portion and the second end portion.

* * * * *